US012379678B2

(12) United States Patent
Suzuki et al.

(10) Patent No.: US 12,379,678 B2
(45) Date of Patent: Aug. 5, 2025

(54) CARRIER FOR FORMING ELECTROPHOTOGRAPHIC IMAGE, DEVELOPER, IMAGE FORMING METHOD, IMAGE FORMING APPARATUS, AND PROCESS CARTRIDGE

(71) Applicants: Namie Suzuki, Shizuoka (JP); Kousuke Suzuki, Shizuoka (JP); Tohru Suganuma, Shizuoka (JP); Masashi Nagayama, Shizuoka (JP); Minoru Masuda, Shizuoka (JP); Hiroyuki Kishida, Shizuoka (JP); Kento Takeuchi, Shizuoka (JP); Kaede Masuko, Shizuoka (JP)

(72) Inventors: Namie Suzuki, Shizuoka (JP); Kousuke Suzuki, Shizuoka (JP); Tohru Suganuma, Shizuoka (JP); Masashi Nagayama, Shizuoka (JP); Minoru Masuda, Shizuoka (JP); Hiroyuki Kishida, Shizuoka (JP); Kento Takeuchi, Shizuoka (JP); Kaede Masuko, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 670 days.

(21) Appl. No.: 17/652,570

(22) Filed: Feb. 25, 2022

(65) Prior Publication Data

US 2022/0291604 A1 Sep. 15, 2022

(30) Foreign Application Priority Data

Mar. 12, 2021 (JP) ................................. 2021-040559

(51) Int. Cl.
*G03G 9/113* (2006.01)
*G03G 9/08* (2006.01)
*G03G 15/08* (2006.01)

(52) U.S. Cl.
CPC ......... *G03G 9/1139* (2013.01); *G03G 9/0823* (2013.01); *G03G 9/1133* (2013.01); *G03G 9/1136* (2013.01); *G03G 15/08* (2013.01)

(58) Field of Classification Search
CPC .............................. G03G 9/113; G03G 9/1139
See application file for complete search history.

(56) References Cited

U.S. PATENT DOCUMENTS

2013/0252169 A1 9/2013 Yaguchi et al.
2017/0329248 A1* 11/2017 Nakamura ........... G03G 9/1133
(Continued)

FOREIGN PATENT DOCUMENTS

EP 1840660 A2 * 10/2007 ......... C01G 49/0036
JP 2010-230836 10/2010
(Continued)

*Primary Examiner* — Peter L Vajda
(74) *Attorney, Agent, or Firm* — Grüneberg and Myers PLLC

(57) ABSTRACT

A carrier for forming an electrophotographic image is provided. The carrier comprises a core particle and a coating layer coating the core particle. The coating layer contains a conductive component comprising an element A, and a coating resin comprising an element B. The element A is undetected in the coating resin by an energy dispersive X-ray spectrometer, and the element B is undetected in the conductive component by the energy dispersive X-ray spectrometer. A standard deviation of a value A/B is 0.4 or less, where the value A/B is a ratio of the element A to the element B in intensity measured by the energy dispersive X-ray spectrometer.

12 Claims, 2 Drawing Sheets

CROSS SECTION OF CARRIER

(56) References Cited

U.S. PATENT DOCUMENTS

| | | | | |
|---|---|---|---|---|
| 2018/0120724 | A1 | 5/2018 | Sakata et al. | |
| 2020/0166867 | A1* | 5/2020 | Nagayama | G03G 9/1131 |
| 2020/0183297 | A1 | 6/2020 | Murata et al. | |
| 2020/0319571 | A1 | 10/2020 | Takeuchi et al. | |

FOREIGN PATENT DOCUMENTS

| | | |
|---|---|---|
| JP | 2011-209678 | 10/2011 |
| JP | 2013-195734 | 9/2013 |
| JP | 2014-048455 | 3/2014 |
| JP | 2016-212254 | 12/2016 |
| JP | 2017-167387 | 9/2017 |
| JP | 2020-086084 | 6/2020 |

* cited by examiner

CARRIER FOR FORMING ELECTROPHOTOGRAPHIC IMAGE, DEVELOPER, IMAGE FORMING METHOD, IMAGE FORMING APPARATUS, AND PROCESS CARTRIDGE

CROSS-REFERENCE TO RELATED APPLICATIONS

This patent application is based on and claims priority pursuant to 35 U.S.C. § 119(a) to Japanese Patent Application No. 2021-040559, filed on Mar. 12, 2021, in the Japan Patent Office, the entire disclosure of which is hereby incorporated by reference herein.

BACKGROUND

Technical Field

The present disclosure relates to a carrier for forming an electrophotographic image, a developer, an image forming method, an image forming apparatus, and a process cartridge.

Description of the Related Art

In an electrophotographic image forming process, an electrostatic latent image is formed on an electrostatic latent image bearer (e.g., photoconductive substance), and a charged toner is attached to the electrostatic latent image to form a toner image. The toner image is then transferred onto a recording medium and fixed thereon, thereby outputting an image. In recent years, electrophotographic technology for multifunction peripherals and printers has rapidly expanded from monochrome printing to full-color printing, and the market of full-color printing is still expanding.

In a typical full-color image forming process, three color toners including yellow, magenta, and cyan toners, or four color toners further including black toner in addition to the three color toners, are stacked to reproduce all possible colors. Therefore, to obtain a vivid full-color image with excellent color reproducibility, the surface of the fixed toner image should be smoothened to reduce light scattering. To smoothen the toner image, it is known that conventional full-color copiers have attempted to increase the amount of toner attached to an electrostatic latent image and control thermal properties (e.g., glass transition temperature (Tg) and softening temperature (T½)) of the binder resin of toner without adversely affecting fixability, durability, and heat resistance.

In the field of production printing where the market is expanding lately, higher image quality than ever has been demanded. Since the carrier is subjected to a strong stress inside the developing device in high-speed development, the coating resin of the carrier is worn away, and the core material is exposed. As a result, the carrier is transferred onto the electrostatic latent image bearer. This phenomenon is generally called "carrier deposition". The carrier deposition causes an undesirable phenomenon in which white spots (where toner is partly absent like white dots) appear at the edge and central portion of the image. Measures against this phenomenon have been more severely demanded in recent years.

On the other hand, carrier deposition can be prevented by designing the carrier to have a high level of resistance from the initial stage so that the resistance is maintained at a high level. In this case, however, the charge of the surface of the carrier cannot be appropriately leaked immediately after image development, which may cause an undesirable phenomenon in which the edge portion of a halftone image becomes less dense.

Thus, in recent years, to achieve high image quality and long life, stress resistance of carriers and resistance adjustment for carriers have been studied.

One generally known method to impart electrical conductivity to a carrier is to control the electrical resistance by containing carbon black, which is an electrically conductive powder, in the coating layer of the carrier to reduce the resistance. Such a carrier is capable of forming good quality images in the initial stage. On the other hand, as the number of copies increases, the coating layer gets scraped and the image quality deteriorates. In addition, the scraping of the coating layer and detachment of carbon black from the coating layer cause color contamination.

SUMMARY

Embodiments of the present invention provides a carrier for forming an electrophotographic image. The carrier comprises a core particle and a coating layer coating the core particle. The coating layer contains a conductive component comprising an element A, and a coating resin comprising an element B. The element A is undetected in the coating resin by an energy dispersive X-ray spectrometer, and the element B is undetected in the conductive component by the energy dispersive X-ray spectrometer. A standard deviation of a value A/B is 0.4 or less, where the value A/B is a ratio of the element A to the element B in intensity measured by the energy dispersive X-ray spectrometer.

Embodiments of the present invention provides a developer comprising the above carrier and a toner.

Embodiments of the present invention provides an image forming method including forming an image with the above developer.

Embodiments of the present invention provides an image forming apparatus including the above developer.

Embodiments of the present invention provides a process cartridge including the above developer.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
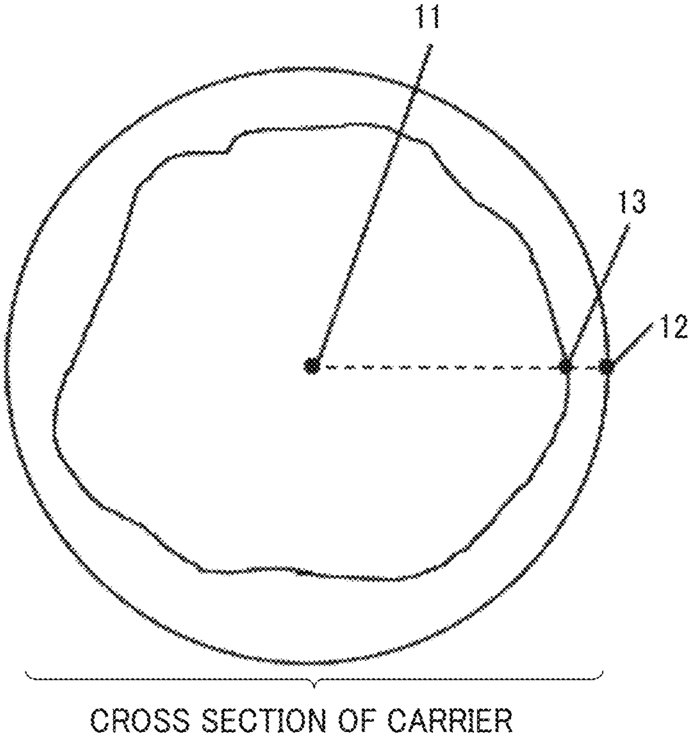
FIG. 1 is an illustration for explaining how to measure the thickness of the coating layer of a carrier.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Embodiments of the present invention provide the following items (1) to (9).

(1) A carrier for forming an electrophotographic image, the carrier comprising:

a core particle; and a coating layer coating the core particle, the coating layer containing:

a conductive component comprising an element A; and a coating resin comprising an element B, wherein the element A is undetected in the coating resin by an energy dispersive X-ray spectrometer, wherein the element B is undetected in the conductive component by the energy dispersive X-ray spectrometer, and wherein a standard deviation of a value A/B is 0.4 or less, where the value A/B is a ratio of the element A to the element B in intensity measured by the energy dispersive X-ray spectrometer.

(2) The carrier according to above (1), wherein the element B is silicon.

(3) The carrier according to above (1) or (2), wherein the conductive component comprises at least one member selected from the group consisting of: doped tin oxides doped with tungsten, indium, phosphorus, tungsten oxide, indium oxide, or phosphorus oxide; and particles having at least one of the doped tin oxides on surfaces thereof.

(4) The carrier according to any of above (1) to (3), wherein the coating layer further contains chargeable particles, the chargeable particles comprising at least one member selected from the group consisting of barium sulfate, zinc oxide, magnesium oxide, magnesium hydroxide, and hydrotalcite.

(5) The carrier according to above (4), wherein the chargeable particles comprise barium sulfate, and a proportion of barium exposed at a surface of the coating layer is 0.1% by atom or more.

(6) A developer comprising:

the carrier according to any one of above (1) to (5); and a toner.

(7). An image forming method comprising:

forming an image with the developer according to above (6).

(8) An image forming apparatus comprising:

the developer according to above (6).

(9) A process cartridge comprising:

the developer according to above (6).

The carrier for forming an electrophotographic image (hereinafter simply "carrier") according to an embodiment of the present invention is described in detail below.

The carrier for forming an electrophotographic image of the present embodiment comprises a core particle and a coating laver coating the core particle. The coating layer contains a coating resin and a conductive component. The conductive component comprises an element A, and the coating resin comprises an element B. The element A is undetected in the coating resin by an energy dispersive X-ray spectrometer (EDX), and the element B is undetected in the conductive component by the EDX. A standard deviation of a value A/B is 0.4 or less, where the value A/B is a ratio of the element A to the element B in intensity measured by the energy dispersive X-ray spectrometer.

The above carrier for forming an electrophotographic image has the controlled resistance and charge for achieving the required level of image quality in the field of production printing, by containing inorganic particles (as a conductive component) in an increased amount to have a low resistance. The carrier is prevented from, for an extended period of time, causing carrier deposition, and toner scattering in the case of using a low-temperature-fixing toner.

The coating layer of the carrier contains a coating resin and a conductive component.

In the present disclosure, the conductive component is present in the coating layer and enhances low conductivity of the coating resin. When the conductive component comprises inorganic particles, the inorganic particles have a powder resistivity of preferably 200 Ω·cm or less, more preferably from 0 to 100 Ω·cm. The powder resistivity of the conductive component can be measured using, for example, an LCR meter (product of Yokogawa-Hewlett-Packard, Ltd.).

Preferably, the conductive component is less colored, i.e., white or colorless as much as possible to prevent color contamination of toner, even when the coating layer is gradually scraped off and the conductive component (serving as a resistance adjusting agent) is detached from the carrier surface over a long-term use. Preferred examples of materials having good color and conductive function include tin oxides doped with tungsten, indium, phosphorus, tungsten oxide, indium oxide, or phosphorus oxide. These doped tin oxides can be used as they are or provided to the surfaces of base particles. As the base particles, any known material can be used. Examples thereof include, but are not limited to, aluminum oxide and titanium oxide.

When inorganic particles are used as the conductive component, the inorganic particles preferably have an equivalent circle diameter of from 600 to 1,000 nm. When the equivalent circle diameter is 600 nm or more, the particle diameter is not too small, and the carrier resistance can be efficiently reduced. When the equivalent circle diameter is 1,000 nm or less, the conductive component is less likely to be detached from the surface of the coating layer.

Conductive polymer particles may also be used as the conductive component. The conductive polymer particles are composed of a conductive polymer and dopant ions. The conductive polymer in the form of particles exhibits conductivity when dispersed in a solution or a coating resin. When the conductive polymer is present in the form of particles together with the dopant ions, the conductive polymer can be dispersed in a carrier coating liquid and can impart conductivity to the resulting carrier by coating. Moreover, even when the conductive polymer is detached from the coating layer, discoloration of the toner does not occur, and deterioration of image quality due to color contamination is prevented. The conductive polymer particles are not particularly limited. For example, poly(3,4-ethylenedioxythiophene) ("PEDOT") is preferred as the conductive polymer, and PEDOT/PSS that is the combination of PEDOT with polystyrene sulfonic acid ("PSS") as a dopant ion is more preferred. Examples of the conductive polymer further include, but are not limited to, polythiophene, polythiophene derivatives, polypyrrole, polypyrrole derivatives, polyaniline, and polyaniline derivatives. Examples of the dopant ion include, but are not limited to, β-naphthalenesulfonic acid, dodecylsulfonic acid, p-dodecylbenzenesulfonic acid, 10-camphorsulfonic acid, 1,2-benzenedicarboxylic acid-4-sulfonic acid-1,2-di(2-ethylhexyl) ester, sulfoisophthalate, and high-molecular-weight strongly acidic substances. When the conductive component that has the resistance adjusting function are less likely to be detached, the carrier resistance is less likely to fluctuate, and the reliability in image quality is improved.

In the present embodiment, the proportion of the conductive component to the coating resin is preferably from 0.5% to 30% by mass, and more preferably from 0.5% to 15% by mass.

The coating resin is not particularly limited and can be suitably selected to suit to a particular application. Preferred examples thereof include silicone resins, acrylic resins, and combinations thereof. Acrylic resins have high adhesiveness and low brittleness and thereby exhibit superior wear resistance. At the same time, acrylic resins have a high surface energy. Therefore, when used in combination with a toner which easily cause adhesion, the adhered toner components may be accumulated on the acrylic resin to cause a decrease of the amount of charge. This problem can be solved by using a silicone resin in combination with the acrylic resin. This is because silicone resins have a low surface energy and therefore the toner components are less likely to adhere thereto, which prevents accumulation of the adhered toner components that causes detachment of the coating film. At the same time, silicone resins have low adhesiveness and high brittleness and thereby exhibit poor wear resistance. Thus, it is preferable that these two types or resins be used in a good balance to provide a coating layer having wear resistance to which toner is difficult to adhere. This is because silicone resins have a low surface energy and the toner components are less likely to adhere thereto, which prevents accumulation of the adhered toner components that causes detachment of the coating film.

In the present disclosure, silicone resins refer to all known silicone resins. Examples thereof include, but are not limited to, straight silicone resins consisting of organosiloxane bonds, and modified silicone resins (e.g., alkyd-modified, polyester-modified, epoxy-modified, acrylic-modified, and urethane-modified silicone resins). Specific examples of commercially-available products of the straight silicone resins include, but are not limited to, KR271, KR255, and KR152 (products of Shin-Etsu Chemical Co., Ltd.); and SR2400, SR2406, and SR2410 (products of Dow Corning Toray Silicone Co., Ltd.). Each of these silicone resins may be used alone or in combination with a cross-linking component and/or a charge amount controlling agent. Specific examples of the modified silicone resins include, but are not limited to, commercially-available products such as KR206 (alkyd-modified), KR5208 (acrylic-modified), ES1001N (epoxy-modified), and KR305 (urethane-modified) (products of Shin-Etsu Chemical Co., Ltd.); and SR2115 (epoxy-modified) and SR2110 (alkyd-modified) (products of Dow Corning Toray Silicone Co., Ltd.).

Examples of polycondensation catalysts include, but are not limited to, titanium-based catalysts, tin-based catalysts, zirconium-based catalysts, and aluminum-based catalysts. Among these catalysts, titanium-based catalysts are preferred for their excellent effects, and titanium diisopropoxybis(ethyl acetoacetate) is most preferred. The reason for this is considered that this catalyst effectively accelerates condensation of silanol groups and is less likely to be deactivated.

In the present disclosure, acrylic resins refer to all known resins containing an acrylic component and are not particularly limited. Each of these acrylic resins may be used alone or in combination with at least one cross-linking component. Specific examples of the cross-linking component include, but are not limited to, amino resins and acidic catalysts. Specific examples of the amino resins include, but are not limited to, guanamine resins and melamine resins. The acidic catalysts here refer to all materials having a catalytic action. Specific examples thereof include, but are not limited to, those having a reactive group of a completely alkylated type, a methylol group type, an imino group type, or a methylol/imino group type.

In the present embodiment, the proportion of the coating resin in the carrier is preferably from 0.1% to 30% by mass, and more preferably from 0.1% to 15% by mass.

In the present embodiment, the conductive component comprises an element A, and the coating resin comprises an element B. The element A is undetected in the coating resin by an energy dispersive X-ray spectrometer (EDX), and the element B is undetected in the conductive component by the EDX. A standard deviation of a value A/B is 0.4 or less, where the value A/B is a ratio of the element A to the element B in intensity measured by the energy dispersive X-ray spectrometer.

Presence of the element A and the element B in the conductive component and the coating resin, respectively, makes it possible to grasp the dispersion state of the conductive component dispersed in the coating resin.

In addition, the standard deviation of the value A/B, which is the ratio of the element A to the element B in intensity measured by the EDX, being 0.4 or less indicates that the conductive component is uniformly dispersed in the coating resin. Thus, either a decrease in resistance due to detachment of the conductive component from the coating resin layer caused by the initial stress in printing or the occurrence of carrier deposition due to the decrease in resistance are prevented. Further, since the resistance value of the carrier surface is uniform, frictional charging with the toner is well performed and the occurrence of toner scattering is prevented.

The value A/B is the ratio of the intensity of the element A to the intensity of the element B measured for each carrier particles using an energy dispersive X-ray spectrometer (EDX). The standard deviation of the value A/B is calculated from 300 carrier particles.

More preferably, the standard deviation of the value A/B is 0.2 or less.

In the present disclosure, a measurement sample for the energy dispersive X-ray spectrometer (EDX) is prepared by placing carrier particles on a piece of carbon tape. The energy dispersive X-ray spectrometer (EDX) is composed of SU8230 (product of Hitachi High-Tech Corporation), FlatQUAD (product of Bruker AXS), and ESPRIT Feature Particle Analysis software program (product of Bruker AXS). The measurement conditions involve an acceleration voltage of 15 kV and an observation magnification of 200 times, and the unit for element intensity is [% by mass].

In the following embodiment, the element A is Sn, and the element B is Si, but embodiments of the present invention are not limited thereto. In another embodiment, the element A is Al, and the element B is Si. In yet another embodiment, the element A is Si, and the element B is F.

The standard deviation of the value A/B can be adjusted to 0.4 or less by appropriately changing the type and addition amount of a dispersing agent.

In the present disclosure, it is preferable that the coating layer further contain chargeable particles in addition to the conductive component.

When the carrier contains chargeable particles in the coating layer, the carrier is prevented from lowering its charging ability during supply and consumption of toner over a high image area, due to the charge-imparting function of the chargeable particles, thereby preventing the occurrence of abnormal phenomena such as toner scattering and background fouling caused by a charge decrease.

The chargeable particles here refer to particles having a relatively low ionization potential, and more specifically, particles having a lower ionization potential than alumina particles (AA-03, product of Sumitomo Chemical Co., Ltd.). Preferred materials include barium sulfate, zinc oxide, magnesium oxide, magnesium hydroxide, and hydrotalcite, and particularly suitable materials include barium sulfate. The ionization potential is measured using an instrument PYS-202, product of Sumitomo Heavy Industries, Ltd. When the chargeable particles comprise barium sulfate, the proportion of barium exposed at the surface of the coating layer is preferably 0.1% by atom or more. Since charge exchange is performed in the surface layer of the coating layer, for charging the toner, in the case of a carrier in which the exposure of barium sulfate to the surface of the coating layer is extremely small, the charge imparting ability of barium sulfate is exhibited only when the coating layer is largely scraped off by a long-term use of the carrier. When the proportion of barium exposed at the surface of the coating layer is 0.1% by atom or more, the charging ability is exerted even not only when the coating layer has been scraped off but also when the carrier has been spent by adherence of toner components to the surface layer of the carrier during a long-term use, which is preferred.

The amount of exposure of barium sulfate at the surface layer of the carrier can be detected as the atomic percent of barium determined by a peak analysis performed by an instrument AXIS/ULTRA (product of Shimadzu/KRATOS). The beam irradiation region of the instrument is approximately 900 μm×600 μm. The detection is performed at each of 17 beam irradiation regions in each of 25 carrier particles. The penetration depth is from 0 to 10 nm. Information near the surface layer of the carrier is detected. Specifically, the measurement is carried out by setting the measurement mode to Al: 1486.6 eV, the excitation source to monochrome (Al), the detection method to spectrum mode, and the magnet lens to OFF. First, the detected elements are identified by a wide scan, and then peaks for each detected element are detected by a narrow scan. After that, the atomic percent of barium with respect to all detected elements is calculated using the peak analysis software program attached to the instrument.

The proportion of barium exposed at the surface of the coating layer is more preferably from 0.1% to 1.0% by atom.

The chargeable particles are not particularly limited in particle size, but the equivalent circle diameter thereof is preferably from 400 to 900 nm. Within this range, the chargeable particles protrude from the surface of the coating layer, which ensures toner charging ability. To ensure reliable charging ability and developing ability, the equivalent circle diameter of the chargeable particles is more preferably 600 nm or more. When the equivalent circle diameter of the chargeable particles is 900 nm or less, the particle diameters of the chargeable particles are not too large with respect to the thickness of the coating layer. Therefore, the chargeable particles are reliably retained in the binder resin and less likely to be detached from the coating resin layer, which is preferred.

The particle diameters of the chargeable particles can be measured by cutting the carrier by ion milling and observing a cross section with a scanning electron microscope (SEM) and/or an energy dispersive X-ray spectrometer (EDX).

Specific procedures are as follows. The carrier is mixed in an embedding resin (EPOFIX, product of Struers, two-component mixture, 12-hour curable epoxy resin), left over one night or longer for curing, and cut by a cutter to prepare a rough cross section sample. The cross section is finished using an ion milling system (IM4000PLUS, product of Hitachi High-Technologies Corporation) at an acceleration voltage of 4.5 kV and a processing time of 5 hours. The finished cross section is photographed using a scanning electron microscope (MERLIN, product of Carl Zeiss AG) at an acceleration voltage of 0.8 kV and a magnification of 10,000 times. The photographed image is incorporated into a TIFF (tagged image file format) image to measure the equivalent circle diameters of 100 chargeable particles using IMAGE-PRO PLUS, product of Media Cybernetics, Inc., and the measured values are averaged. The thickness of the coating layer is measured from the photographed image in the same manner. Since each particle has an individual difference and the thickness of the coating layer varies depending on the location, the measurement is performed at 10 locations for each of 50 particles, and the average of the measured values is taken as the thickness of the coating layer.

FIG. 1 an illustration for explaining how to measure the thickness of the coating layer. The thickness of the coating layer is equivalent to the length of a line segment between an interface 12 and an interface 13, where the interface 12 is between the coating resin and the air, the interface 13 is between the coating resin and the core particle, and the line segment is on a straight line drawn from a center 11 of the core particle toward the interface 12.

In the present disclosure, the thickness of the coating layer is preferably from 0 to 10 μm, and more preferably from 0.2 to 7 μm.

Preferably, the carrier of the present embodiment contains a dispersing agent in the coating layer.

When a coating liquid for forming the coating layer that contains a coating resin, inorganic particles, a diluting solvent, etc., further contains the dispersing agent, the inorganic particles can be dispersed to the primary particle diameter and the particle size distribution thereof can be narrowed. As a result, particles which are weakly fixed to the surface of the carrier without being sufficiently embedded in the binder resin, such as coarse particles, are eliminated. Thus, either a decrease in resistance due to detachment of the conductive component from the coating resin caused by the initial stress in printing or the occurrence of carrier deposition due to the decrease in resistance are prevented. The dispersing agent has both a group having an affinity for the resin and a group having an affinity for the inorganic particles. Therefore, the dispersing agent has an effect of improving the affinity between the resin and the inorganic particles. As a result, the adhesion between the resin and the inorganic particles is enhanced in the coating layer to form a stronger film, and the particles are less likely to be detached from the coating layer even under stress over time during printing. Thus, the occurrence of carrier deposition can be prevented for an extended period of time. In addition, since the chargeable particles that charge the toner is prevented from being detached, the charging ability of the toner can be maintained over time, preventing the occurrence of toner scattering.

Preferably, the dispersing agent is used in combination with a defoaming agent. When a coating liquid for forming the coating layer that contains a coating resin, inorganic particles, a diluting solvent, etc., further contains the dispersing agent, the coating liquid is likely to foam because the dispersing agent is a surfactant. If such a foamed coating liquid is used for coating, the resulting coating layer has incorporated bubbles therein, and voids derived from the bubbles are generated in the coating layer. The voids in the coating layer significantly reduce the durability of the film, and scraping off of the film progresses. For this reason, it is not possible to achieve the above-described effect of preventing the occurrence of carrier deposition and toner scattering only by the use of the dispersing agent. It is effective to use the dispersing agent in combination with the defoaming agent, for preventing the coating liquid from foaming.

The dispersing agent is not particularly limited. Examples thereof include, but are not limited to, phosphate-based surfactants, sulfate-based surfactants, sulfonic-acid-based surfactants, and carboxylic-acid-based surfactants. Among these, phosphate-based surfactants are preferred. In this case, the conductive component and the chargeable particles are satisfactorily dispersed to the primary particle diameter, the components in the coating layer are homogenized, and the affinity between the resin and the inorganic particles is enhanced.

As a result of studies by the inventors of the present invention, it has been found that the addition of a dispersing agent having a phosphate structure further improves the margin for preventing toner scattering. This is because the phosphate structure is positively chargeable, while toner is generally negatively chargeable. When a dispersing agent containing a phosphate is added, the ability for charging the toner is improved as compared with the case where it is not added. In particular, the charging ability immediately after mixing and stirring with toner, in other words, the charge rising property, is improved. Therefore, the occurrence of toner scatting at the time of toner supply, caused when the supplied toner is insufficiently charged, is effectively prevented. The phosphate-based surfactant serving as the dispersing agent preferably contains a phosphate as a main component. In order to be the "main component" in the present embodiment, the proportion of the phosphate in the dispersing agent is preferably 50% by mass or more, and more preferably 90% by mass or more. Examples of commercially-available products thereof include, but are not limited to, SOLSPERSE 2000, 2400, 2600, 2700, and 2800 (products of Zeneca), AJISPER PB711, PA111, PB811, and PW911 (products of Ajinomoto Co., Inc.), EFKA-46, 47, 48, and 49 (products of EFKA Chemicals B.V.), DISPERBYK 160, 162, 163, 166, 170, 180, 182, 184, and 190 (products of BYK-Chemie GmbH), and FLOWLEN DOPA-158, 22, 17, G-700, TG-720W, and 730W (products of Kyoeisha Chemical Co., Ltd.).

The addition amount of the dispersing agent is preferably from 0.5 to 10.0 parts by mass with respect to 100 parts by mass of all inorganic particles present in the coating layer, such as the conductive component and the chargeable particles. When the addition amount of the dispersing agent is 0.5 parts by mass or more, all the inorganic particles can be dispersed to the primary particle diameter, and agglomerated inorganic particles are less likely to remain. These agglomerated particles are not sufficiently immobilized on the coating layer and detached due to stress at the initial stage of printing. Thus, the resistance is lowered, and carrier deposition occurs. When the addition amount of the dispersing agent is 0.5 parts by mass or more, the amount of the dispersing agent present on the outermost surface of the coating layer is sufficient. Thus, the charge rising property is good, which is advantageous in preventing toner scattering. When the addition amount of the dispersing agent is 10.0 parts by mass or less, the dispersing agent components which cannot be adsorbed to the inorganic particles are not present in the coating resin in a large amount. Thus, the durability of the film is improved, and the inorganic particles are less likely to be detached. For these reasons, the addition amount of the dispersing agent is preferably from 0.5 to 10.0 parts by mass, more preferably from 1.0 to 3.0 parts by mass, with respect to 100 parts by mass of all inorganic particles present in the coating layer, such as the conductive component and the chargeable particles.

The defoaming agent is not particularly limited. Examples thereof include silicone-based, acrylic-based, and vinyl-based defoaming agents. Among these, silicone-based defoaming agents are preferred. The defoaming effect is exerted depending on the balance between compatibility and incompatibility with a solvent. Silicone-based defoaming agents have a good balance between compatibility and incompatibility and exerts a high defoaming effect even with a small amount, preventing generation of voids in the coating resin. Examples of commercially-available products thereof include, but are not limited to, KS-530. KF-96, KS-7708, KS-66, and KS-69 (products of Silicone Division of Shin-Etsu Chemical Co., Ltd.), TSF451, THF450, TSA720, YSA02, TSA750, and TSA750S (products of Momentive Performance Materials Inc.), BYK-065, BYK-066N, BYK-070, BYK-088, and BYK-141 (products of BYK-Chemie GmbH), and DISPARLON 1930N, DISPARLON 1933, and DISPARLON 1934 (products of Kusumoto Chemicals, Ltd.). The addition amount of the defoaming agent is preferably from 1.0 to 10.0 parts by mass with respect to 100 parts by mass of the coating liquid for forming the coating layer. When the addition amount of the defoaming agent is 1.0 part by mass or more, the defoaming effect is sufficiently exerted, and undesirable phenomena such as generation of voids in the coating resin are prevented. When the addition amount of the defoaming agent is 10.0 parts by mass or less, the occurrence of cissing (i.e., coating film surface defects) can be prevented, and embrittlement of the coating layer on the carrier surface and detachment of the inorganic particles can be prevented. For these reasons, the addition amount of the defoaming agent is preferably from 1.0 to 10.0 parts by mass, more preferably from 3.0 to 7.0 parts by mass, with respect to 100 parts by mass of the coating liquid.

Core Particle

The core particle is not particularly limited as long as it is a magnetic material. Specific examples thereof include, but are not limited to: ferromagnetic metals such as iron and cobalt; iron oxides such as magnetite, hematite, and ferrite; various alloys and compounds; and resin particles in which these magnetic materials are dispersed. Among these materials, Mn ferrite, Mn—Mg ferrite, and Mn—Mg—Sr ferrite are preferred because they are environmentally-friendly.

The volume average particle diameter of the core particle of the carrier is not particularly limited. For preventing the occurrence of carrier deposition and carrier scattering, the volume average particle diameter is preferably 20 μm or more. For preventing the production of abnormal images (e.g., stripes made of carrier particles) and deterioration of image quality, the volume average particle diameter is preferably 100 μm or less. In particular, a core particle having a volume average particle diameter of from 28 to 40 μm can meet a recent demand for higher image quality.

Other Components

The coating layer may further contain other components such as a silane coupling agent.

Silane Coupling Agent

The coating layer may contain a silane coupling agent to stably disperse the inorganic particles. Specific examples of the silane coupling agent include, but are not limited to, γ-(2-aminoethyl)aminopropyltrimethoxysilane, γ-(2-aminoethyl)aminopropylmethyldimethoxysilane, γ-methacryloxypropyltrimethoxysilane, N-β-(N-vinylbenzylaminoethyl)-γ-aminopropyltrimethoxysilane hydrochloride, γ-glycidoxypropyltrimethoxysilane, γ-mercaptopropyltrimethoxysilane, methyltrimethoxysilane, methyltriethoxysilane, vinyltriacetoxysilane, γ-chloropropyltrimethoxysilane, hexamethyldisilazane, γ-anilinopropyltrimethoxysilane, vinyltrimethoxysilane, octadecyldimethyl[3-(trimethoxysilyl)propyl]ammonium chloride, γ-chloropropylmethyldimethoxysilane, methyltrichlorosilane, dimethyldichlorosilane, trimethylchlorosilane, allyltriethoxysilane, 3-aminopropylmethyldiethoxysilane, 3-aminopropyltrimethoxysilane, dimethyldiethoxysilane, 1,3-divinyltetramethyldisilazane, and methacryloxyethyldimethyl(3-trimethoxysilylpropyl) ammonium chloride. Two or more of them can be used in combination. Specific examples of commercially-available products of the silane coupling agents include, but are not limited to, AY43-059, SR6020, SZ6023, SH6026, SZ6032, SZ6050, AY43-310M. SZ6030, SH6040, AY43-026. AY43-031, sh6062, Z-6911, sz6300, sz6075, sz6079, sz6083, sz6070, sz6072, Z-6721, AY43-004, Z-6187, AY43-021, AY43-043, AY43-040, AY43-047, Z-6265, AY43-204M, AY43-048, Z-6403, AY43-206M, AY43-206E, Z6341, AY43-210MC, AY43-083, AY43-101, AY43-013, AY43-158E, Z-6920, and Z-6940 (products of Toray Silicone Co., Ltd.). Preferably, the proportion of the silane coupling agent to the coating resin is from 0.1% to 10% by mass. When the proportion of the silane coupling agent is 0.1% by mass or more, an undesired phenomenon is prevented in which adhesion strength between the core particle/conductive particle and the resin is lowered to cause detachment of the coating layer during a long-term use. When the proportion is 10% by mass or less, an undesired phenomenon is prevented in which toner filming occurs in a long-term use.

A developer according to an embodiment of the present invention contains the carrier according to an embodiment of the present invention and a toner.

The toner comprises a binder resin. The toner may be any of monochrome toner, color toner, white toner, transparent toner, or metallic luster toner. The toner may be produced by any method such as pulverization methods and polymerization methods.

In a typical pulverization method, toner materials are melt-kneaded, the melt-kneaded product is cooled and pulverized into particles, and the particles are classified by size, thus preparing mother particles. To more improve transferability and durability, an external additive is added to the mother particles, thus obtaining a toner. Specific examples of the kneader for kneading the toner materials include, but are not limited to, a batch-type double roll mill; BANBURY MIXER; double-axis continuous extruders such as TWIN SCREW EXTRUDER KTK (product of Kobe Steel, Ltd.), TWIN SCREW COMPOUNDER TEM (product of Toshiba Machine Co., Ltd.), MIRACLE K.C.K (product of Asada Iron Works Co., Ltd.), TWIN SCREW EXTRUDER PCM (product of Ikegai Co., Ltd.), and KEX EXTRUDER (product of Kurimoto, Ltd.); and single-axis continuous extruders such as KOKNEADER (product of Buss Corporation).

The cooled melt-kneaded product may be coarsely pulverized by a HAMMER MILL or a ROTOPLEX and thereafter finely pulverized by a jet-type pulverizer or a mechanical pulverizer. Preferably, the pulverization is performed such that the resulting particles have an average particle diameter of from 3 to 15 μm.

When classifying the pulverized melt-kneaded product, a wind-power classifier may be used. Preferably, the classification is performed such that the resulting mother particles have an average particle diameter of from 5 to 20 μm. The external additive is added to the mother particles by being stir-mixed therewith by a mixer, so that the external additive gets adhered to the surfaces of the mother particles while being pulverized.

Specific examples of the binder resin include, but are not limited to, homopolymers of styrene or styrene derivatives (e.g., polystyrene, poly-p-styrene, polyvinyl toluene), styrene-based copolymers (e.g., styrene-p-chlorostyrene copolymer, styrene-propylene copolymer, styrene-vinyltoluene copolymer, styrene-methyl acrylate copolymer, styrene-ethyl acrylate copolymer, styrene-methacrylic acid copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-vinyl methyl ether copolymer, styrene-vinyl methyl ketone copolymer, styrene-butadiene copolymer, styrene-isoprene copolymer, styrene-maleate copolymer), polymethyl methacrylate, polybutyl methacrylate, polyvinyl chloride, polyvinyl acetate, polyethylene, polyester, polyurethane, epoxy resin, polyvinyl butyral, polyacrylic acid, rosin, modified rosin, terpene resin, phenol resin, aliphatic or aromatic hydrocarbon resin, and aromatic petroleum resin. Two or more of these resins can be used in combination.

Specific examples of usable binder resins for pressure fixing include, but are not limited to: polyolefins (e.g., low-molecular-weight polyethylene, low-molecular-weight polypropylene), olefin copolymers (e.g., ethylene-acrylic acid copolymer, ethylene-acrylate copolymer, styrene-methacrylic acid copolymer, ethylene-methacrylate copolymer, ethylene-vinyl chloride copolymer, ethylene-vinyl acetate copolymer, ionomer resin), epoxy resin, polyester resin, styrene-butadiene copolymer, polyvinyl pyrrolidone, methyl vinyl ether-maleic acid anhydride copolymer, maleic-acid-modified phenol resin, and phenol-modified terpene resin. Two or more of these resins can be used in combination.

Specific examples of usable colorants (i.e., pigments and dyes) include, but are not limited to, yellow pigments such as Cadmium Yellow, Mineral Fast Yellow, Nickel Titanium Yellow, Naples Yellow, Naphthol Yellow S, Hansa Yellow G, Hansa Yellow 10G, Benzidine Yellow GR, Quinoline Yellow Lake, Permanent Yellow NCG, and Tartrazine Lake; orange pigments such as Molybdenum Orange, Permanent Orange GTR, Pyrazolone Orange, Vulcan Orange, Indanthrene Brilliant Orange RK, Benzidine Orange G, and Indanthrene Brilliant Orange GK; red pigments such as Red Iron Oxide, Cadmium Red, Permanent Red 4R, Lithol Red, Pyrazolone Red, Watching Red calcium salt, Lake Red D, Brilliant Carmine 6B, Eosin Lake, Rhodamine Lake B, Alizarin Lake, and Brilliant Carmine 3B; violet pigments such as Fast Violet B and Methyl Violet Lake; blue pigments such as Cobalt Blue, Alkali Blue, Victoria Blue lake, Phthalocyanine Blue, Metal-free Phthalocyanine Blue, partial chlorination product of Phthalocyanine Blue, Fast Sky Blue, and Indanthrene Blue BC; green pigments such as Chrome Green, chromium oxide, Pigment Green B, and Malachite Green Lake; black pigments such as azine dyes (e.g., carbon black, oil furnace black, channel black, lamp black, acetylene black, aniline black), metal salt azo dyes, metal oxides, and combined metal oxides; and white pigments such as titanium oxide. Two or more of these colorants can be used in combination. The transparent toner may contain no colorant.

Specific examples of the release agent include, but are not limited to, polyolefins (e.g., polyethylene, polypropylene), fatty acid metal salts, fatty acid esters, paraffin waxes, amide waxes, polyvalent alcohol waxes, silicone varnishes, carnauba waxes, and ester waxes. Two or more of these materials can be used in combination.

The toner may further contain a charge controlling agent. Specific examples of the charge controlling agent include, but are not limited to: nigrosine; azine dyes having an alkyl group having 2 to 16 carbon atoms: basic dyes such as C. I. Basic Yellow 2 (C. I. 41000), C. I. Basic Yellow 3, C. I. Basic Red 1 (C. I. 45160), C. I. Basic Red 9 (C. I. 42500), C. I. Basic Violet 1 (C. I. 42535), C. I. Basic Violet 3 (C. I. 42555), C. I. Basic Violet 10 (C. I. 45170), C. I. Basic Violet 14 (C. I. 42510), C. I. Basic Blue 1 (C. I. 42025), C. I. Basic Blue 3 (C. I. 51005). C. I. Basic Blue 5 (C. I. 42140), C. I. Basic Blue 7 (C. I. 42595). C. I. Basic Blue 9 (C. I. 52015), C. I. Basic Blue 24 (C. I. 52030), C. I. Basic Blue 25 (C. I. 52025), C. I. Basic Blue 26 (C. I. 44045), C. I. Basic Green 1 (C. I. 42040), and C. I. Basic Green 4 (C. I. 42000); lake pigments of these basic dyes; quaternary ammonium salts such as C. I. Solvent Black 8 (C. I. 26150), benzoylmethylhexadecylammonium chloride, and decyltrimethyl chloride; dialkyl (e.g., dibutyl, dioctyl) tin compounds; dialkyl tin borate compounds; guanidine derivatives, polyamine resins such as vinyl polymers having amino group and condensed polymers having amino group: metal complex salts of monoazo dyes; metal complexes of salicylic acid, dialkyl salicylic acid, naphthoic acid, and dicarboxylic acid with Zn, Al, Co, Cr, and Fe; sulfonated copper phthalocyanine pigments; organic boron salts; fluorine-containing quaternary ammonium salts, and calixarene compounds. Two or more of these materials can be used in combination. For color toners other than black toner, metal salts of salicylic acid derivatives, which are white, are preferred.

Specific examples of the external additive include, but are not limited to, inorganic particles such as silica, titanium oxide, alumina, silicon carbide, silicon nitride, and boron nitride, and resin particles such as polymethyl methacrylate particles and polystyrene particles having an average particle diameter of from 0.05 to 1 μm, obtainable by soap-free emulsion polymerization. Two or more of these materials can be used in combination. Among these, metal oxide particles (e.g., silica, titanium oxide) whose surfaces are hydrophobized are preferred. When a hydrophobized silica and a hydrophobized titanium oxide are used in combination with the amount of the hydrophobized titanium oxide greater than that of the hydrophobized silica, the toner provides excellent charge stability regardless of humidity.

An image forming apparatus according to an embodiment of the present invention contains the above-described developer according to an embodiment of the present invention. Specifically, the image forming apparatus includes: an electrostatic latent image bearer; a charger configured to charge the electrostatic latent image bearer; an irradiator configured to form an electrostatic latent image on the electrostatic latent image bearer; a developing device configured to develop the electrostatic latent image formed on the electrostatic latent image bearer with a developer to form a toner image; a transfer device configured to transfer the toner image from the electrostatic latent image bearer onto a recording medium; and a fixing device configured to fix the transferred toner image on the recording medium. The image forming apparatus may further include other devices such as a neutralizer, a cleaner, a recycler, and a controller, as necessary. The developer is the above-described developer according to an embodiment of the present invention.

An image forming method according to an embodiment of the present invention uses the above-described developer according to an embodiment of the present invention. The image forming method includes: a charging process for charging an electrostatic latent image bearer; an irradiating process for forming an electrostatic latent image on the electrostatic latent image bearer; a developing process for developing the electrostatic latent image formed on the electrostatic latent image bearer into a toner image with a developer; a transferring process for transferring the toner image from the electrostatic latent image bearer onto a recording medium; and a fixing process for fixing the transferred toner image on the recording medium. The method may further include other known processes such as a neutralizing process, a cleaning process, a recycling process, and a controlling process. The developer is the above-described developer according to an embodiment of the present invention.

A process cartridge according to an embodiment of the present invention contains the above-described developer according to an embodiment of the present invention.

Figure 2:
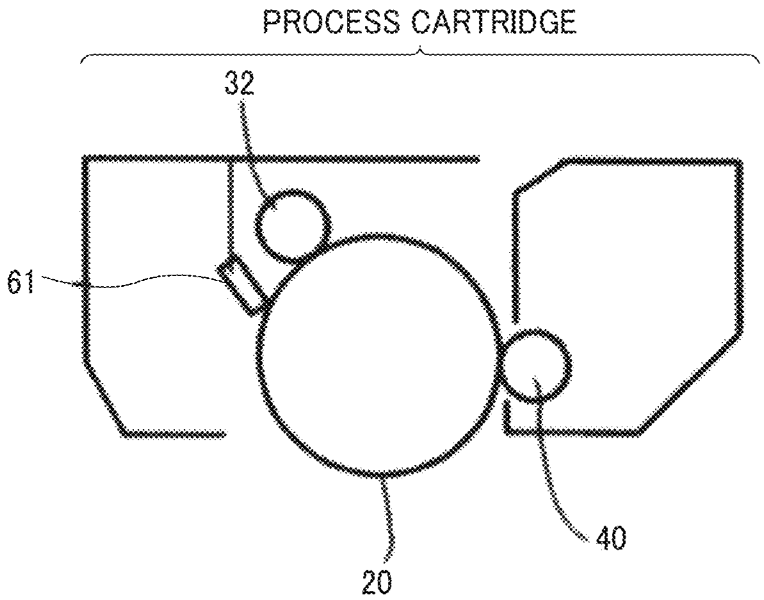
FIG. 2 is a schematic diagram illustrating a process cartridge according to an embodiment of the present invention.

The process cartridge according to an embodiment of the present invention is illustrated in FIG. 2. This process cartridge includes a photoconductor 20, a charger 32 in a proximity-type brush shape, a developing device 40 containing the developer according to an embodiment of the present invention, and a cleaner having a cleaning blade 61. The process cartridge is detachably mountable on an image forming apparatus body. These constituent elements are integrally combined to constitute the process cartridge. The process cartridge is configured to be detachably mountable on an image forming apparatus body such as a copier and a printer.

Figure 3:
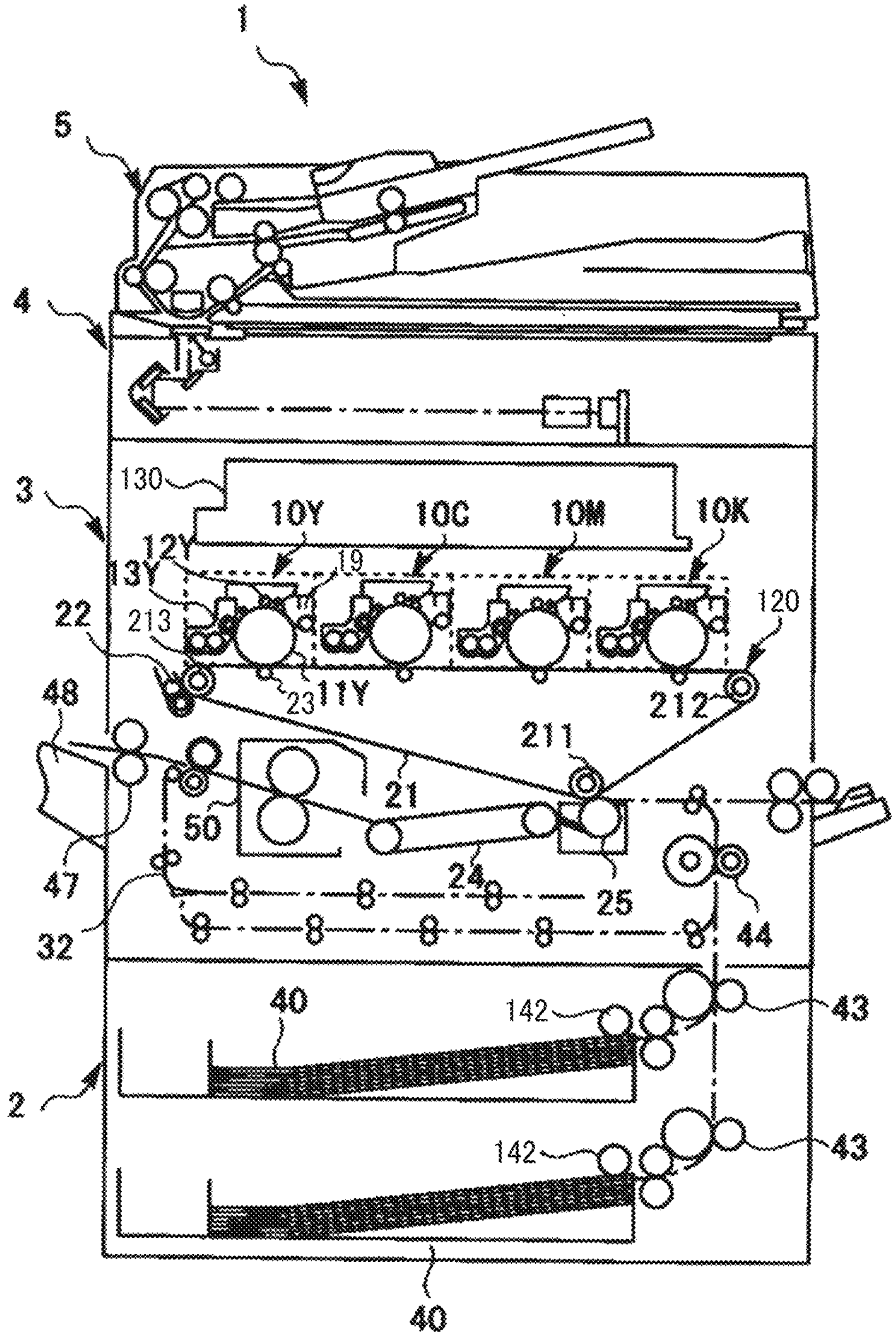
FIG. 3 is a schematic diagram illustrating an image forming apparatus according to an embodiment of the present invention.

FIG. 3 is a schematic diagram illustrating an image forming apparatus according to an embodiment of the present invention.

An image forming apparatus 1 illustrated in FIG. 1 is a tandem image forming apparatus including four image forming stations. The image forming stations form respective images with different colors to finally produce a full-color image.

The image forming process is described in detail below.

The image forming apparatus 1 includes an automatic document feeder (ADF) 5, a scanner 4 that reads documents, and an image forming unit 3 that forms an image on a recording medium based on a digital signal output from an image processor that electrically processes a digital signal output from the scanner 4.

In the scanner 4, a document put on a document table is read by a CCD camera via an emission lamp, a mirror, and a lens. Image information read by the scanner 4 is sent to the image processor.

The image processor converts the image information into an image signal to be sent to the image forming unit 3.

The image forming unit 3 includes four image forming stations 10Y, 10C, 10M, and 10K containing respective toners of yellow, cyan, magenta, and black, arranged in tandem, an intermediate transfer belt 21, and a secondary transfer roller 25. The image forming stations 10Y, 10C, 10M, and 10K may be hereinafter collectively referred to as "image forming stations 10".

The configuration of each of the image forming stations 10 in the image forming apparatus 1 is described below with reference to the yellow image forming station 10Y, containing yellow toner, as a representative.

The cyan image forming station 10C, magenta image forming station 10M, and black image forming station 10K have the same configuration and function as the yellow image forming station 10Y unless otherwise specified.

Each of the image forming stations 10 may be used as a process cartridge 10 that is detachable from and mountable on the image forming apparatus 1.

As an image forming operation is started, in the yellow image forming station 10Y, a surface of a photoconductor 11Y, serving as an electrostatic latent image bearer, is uniformly charged by a charger 12Y.

The photoconductor 11Y includes an electrically-grounded core metal and an organic photosensitive layer formed thereon. A surface of the photoconductor 11Y is uniformly negatively charged by the charger 12Y by corona discharge, and thereafter exposed to light emitted from an irradiator 130 including a laser diode. A part of the charged surface of the photoconductor 11Y, corresponding to an image portion, is irradiated with light, thus forming an electrostatic latent image on the photoconductor 11Y.

As the charged surface of the photoconductor 11Y is exposed to light emitted from the irradiator 130, an electrostatic latent image of an yellow component of an original full-color document is formed thereon. The electrostatic latent image is developed into a yellow toner image with a yellow toner contained in a yellow developing device 13Y.

The same image forming operation is performed in the cyan image forming station 10C, magenta forming station 10M, and black image forming station 10K at predetermined intervals. Thus, a cyan toner image, a magenta toner image, and a black toner image are sequentially formed on the respective photoconductors 11.

To sequentially transfer the yellow, cyan, magenta, and black toner images, formed on the respective photoconductors 11 in the respective image forming stations 10Y, 10C, 10M, and 10K, onto the intermediate transfer belt 21, primary transfer rollers 23 are disposed facing the respective photoconductors 11 with the intermediate transfer belt 21 therebetween. As a transfer bias is applied to each of the primary transfer rollers 23, the yellow, cyan, magenta, and black toner images are sequentially superimposed on one another on the intermediate transfer belt 21, thereby forming a composite full-color toner image.

After the toner images have been transferred onto the intermediate transfer belt 21, surface potentials of the photoconductors 11 in the image forming stations 10 are neutralized by optical neutralizers, and residual toner particles remaining on the photoconductors 11 are removed by cleaning blades of respective cleaners 19. The photoconductors 11 are charged by the respective chargers 12 again and a series of the image forming cycle is repeated. After the toner images have been transferred onto the intermediate transfer belt 21, the surfaces of the photoconductors 11 are neutralized by the optical neutralizers, and residues such as toner particles are removed by the cleaners 19. The residual toner particles removed by the cleaners 19 are fed to a waste toner container via a waster toner feed path.

After the full-color toner image has been transferred onto a recording medium, residual toner particles and paper powders remaining on the intermediate transfer belt 21 are removed by a cleaning brush roller and a cleaning blade included in an intermediate transfer belt cleaner 22 and fed to the waste toner container.

Tension rollers 211 (opposing the secondary transfer roller 25), 212, and 213 are disposed within a transfer unit that involves the intermediate transfer belt 21, a transfer bias power source, and a belt drive shaft. The tension rollers 211, 212, and 213 are controlled by a cam mechanism to impart or release a tension to/from the intermediate transfer belt 21, so that the intermediate transfer belt 21 is brought into contact with or separated from the photoconductors 11.

During an operating period, the intermediate transfer belt 21 is brought into contact with the photoconductors 11 before the photoconductors 11 start rotating. During a non-operating period, the intermediate transfer belt 21 is separated from the photoconductors 11.

After the toner images have been transferred onto the intermediate transfer belt 21, surface potentials of the photoconductors 11 are neutralized by optical neutralizers, and residual toner particles remaining on the photoconductors 11 are removed by respective cleaners 19, as described above. In each cleaner 19, first, a brush roller is brought into contact with the photoconductor 11 while rotating in the opposite direction to the rotation of the photoconductor 11 to disturb residual toner particles and attached matters to reduce their adhesive force to the photoconductor 11, at an upstream position relative to the direction of rotation of the photoconductor 11. Next, an elastic rubber blade is brought into contact with the photoconductor 11 to remove the disturbed toner particles and attached matters at a downstream position relative to the direction of rotation of the photoconductor 11.

The composite full-color toner image formed on the intermediate transfer belt 21 is transferred onto a recording medium that is fed to a gap between the intermediate transfer belt 21 and the secondary transfer roller 25, to which a predetermined bias is applied, in synchronization with an entry of the composite full-color toner image into the gap.

A transfer device 120 includes the primary transfer rollers 23, the secondary transfer roller 25, the intermediate transfer belt 21, and the intermediate transfer belt cleaner 22.

Multiple sheets of the recording medium are stored in multiple sheet trays 40 disposed in a sheet feeder 2. The sheets, one by one, are picked up from the sheet trays 40 by pickup rollers 142 under control by the image forming apparatus 1. Each sheet is fed to the image forming unit 3 by feed rollers 43. The sheet is then fed to the secondary transfer roller 25 by a registration roller 44 in synchronization with an entry of the toner image on the intermediate transfer belt 21 into the gap between the secondary transfer roller 25.

The sheet having the composite full-color toner image thereon is then fed to a fixing device 50. In the fixing device 50, the composite full-color toner image is fixed on the sheet by application of heat and pressure.

When a duplex printing is performed, the sheet is fed from the fixing device 50 to a duplex printing feeder 32 before being fed to an output tray 48.

The sheet is fed to the registration roller 44 again so that an image is formed on the other side of the sheet.

The developing device 13 includes a developing sleeve disposed facing the photoconductor 11. The developing sleeve contains a magnetic field generator inside.

The charger 12 includes a charging roller disposed facing the photoconductor 11.

The charging roller uniformly charges the surface of the photoconductor 11 as a predetermined voltage is applied from a power source, with either contacting or non-contacting the photoconductor 11.

The cleaner 19 includes a cleaning blade that cleans the photoconductor 11.

The cleaner 19 further includes a collection blade and a film for collecting toner particles, and a collection coil for conveying the collected toner particles.

The cleaning blade may be made of a metal, a resin, or a rubber. In particular, fluororubber, silicone rubber, butyl rubber, butadiene rubber, isoprene rubber, and urethane rubber are preferable, and urethane rubber is most preferable.

Additionally, a lubricant applicator that applies a lubricant to the photoconductor 11 may be provided. The lubricant may be, for example, a resin (e.g., fluororesin, silicone resin) or a metal stearate (e.g., zinc stearate, aluminum stearate). In FIG. 3, a numeral 24 denotes a conveyance belt and a numeral 47 denotes an ejection roller.

EXAMPLES

Hereinafter, the present invention is described in more detail with reference to Examples and Comparative Examples. However, the present invention is not limited to these Examples. In the following descriptions, "parts" represents "parts by mass" and "%" represents "% by mass" unless otherwise specified.

Preparation of Toner

Binder Resin Synthesis Example 1

In a reaction vessel equipped with a condenser tube, a stirrer, and a nitrogen introducing tube, 724 parts of ethylene oxide 2 mol adduct of bisphenol A, 276 parts of isophthalic acid, and 2 parts of dibutyltin oxide were allowed to react at 230° C. for 8 hours under normal pressures and subsequently 5 hours under reduced pressures of from 10 to 15 mmHg. After reducing the temperature to 160° C., 32 parts of phthalic anhydride were put in the vessel and allowed to react for 2 hours.

After being cooled to 80° C., the vessel contents were further allowed to react with 188 parts of isophorone diisocyanate in ethyl acetate for 2 hours. Thus, an isocyanate-containing prepolymer (P1) was prepared. Next, 267 parts of the prepolymer (P1) were allowed to react with 14 parts of isophoronediamine at 50° C. for 2 hours. Thus, an urea-modified polyester (U1) having a weight average molecular weight of 64.000 was prepared. In the same manner as described above, 724 parts of ethylene oxide 2 mol adduct of bisphenol A and 276 parts of terephthalic acid were allowed to polycondensate at 230° C. for 8 hours under normal pressures and subsequently react for 5 hours under reduced pressures of from 10 to 15 mmHg. Thus, an unmodified polyester (E1) having a peak molecular weight of 5,000 was prepared. Next, 200 parts of the urea-modified polyester (U1) and 800 parts of the unmodified polyester (E1) were dissolved in 2,000 parts of a mixed solvent of ethyl acetate/methyl ethyl ketone (MEK), where the mixing ratio was 1/1. Thus, an ethyl acetate/MEK solution of a binder resin (B1) was prepared. Apart of the solution was dried under reduced pressures to isolate the binder resin (B1).

Master Batch Preparation Example 1

| | |
|---|---|
| Pigment: C.I. Pigment Yellow 155: | 40 parts |
| Binder resin: Biner resin (B1): | 60 parts |
| Water: | 30 parts |

The above materials were mixed using a HENSCHEL MIXER to prepare a pigment aggregation into which water had permeated. The pigment aggregation was kneaded for 45 minutes by a double roll with its surface temperature set at 130° C. and then pulverized by a pulverizer into particles having a diameter of 1 mm. Thus, a master batch (M1) was prepared.

Toner Production Example A

In a beaker, 240 parts of the ethyl acetate/MEK solution of the binder resin (B1), 20 parts of pentaerythritol tetrabehenate (having a melting point of 81° C. and a melt viscosity of 25 cps), and 8 parts of the master batch (M1) were stirred with a TK HOMOMIXER at 12,000 rpm and 60° C. for uniform dissolution and dispersion. Thus, a toner material liquid was prepared. In another beaker, 706 parts of ion-exchange water, 294 parts of a 10% hydroxyapatite suspension liquid (SUPATAITO 10, product of NIPPON CHEMICAL INDUSTRIAL CO., LTD.), and 0.2 parts of sodium dodecylbenzenesulfonate were uniformly dissolved and heated to 60° C. The above-prepared toner material liquid was put in this beaker while being stirred with a TK HOMOMIXER at 12,000 rpm, and the stirring was continued for 10 minutes. The resulting mixture was transferred to a flask equipped with a stirrer and a thermometer and heated to 98° C. to remove the solvent, then subjected to filtration, washing, drying, and wind-power classification. Thus, mother toner particles A were prepared.

Next, 100 parts of the mother toner particles A were mixed with 1.0 part of a hydrophobic silica and 1.0 part of a hydrophobic titanium oxide using a HENSCHEL MIXER. Thus, a toner A was prepared. The particle diameter of the toner was measured using a particle size analyzer COULTER COUNTER TA2 (product of Coulter Electronics) with an aperture diameter of 100 μm. As a result, the toner A was found to have a volume average particle diameter (Dv) of 6.2 μm and a number average particle diameter (Dn) of 5.1 μm.

Preparation of Carrier

Carrier 1

Composition of Resin Liquid 1

| | | |
|---|---|---|
| Acrylic resin solution (having a solid content concentration of 20% by mass): | 200 | parts by mass |
| Silicone resin solution (having a solid content concentration of 40% by mass): | 2,000 | parts by mass |
| Aminosilane (having a solid content concentration of 100% by mass): | 30 | parts by mass |
| Tungsten-oxide-doped tin oxide (having a powder resistivity of 40 Ω · cm): | 1,160 | parts by mass |
| Barium sulfate (having an average particle diameter of 0.3 μm): | 650 | parts by mass |
| Toluene: | 6,000 | parts by mass |
| Dispersing agent (phosphate-based surfactant): | 37 | parts |
| Defoaming agent (silicone-based): | 510 | parts |

The above materials for the resin liquid 1 were subjected to a dispersion treatment using a HOMOMIXER for 10 minutes, thus obtaining a resin liquid 1 for forming a coating layer. The resin liquid 1 was applied to surfaces of core particles by a SPIRA COTA (product of Okada Seiko Co., Ltd.) at a rate of 30 g/min in an atmosphere having a temperature of 55° C. so as to form a coating layer having an average thickness of 0.7 μm, followed by drying. The thickness of the resulting layer was adjusted by adjusting the amount of the resin liquid. The core particles having the coating layer thereon were burnt in an electric furnace at 150° C. for 1 hour, then cooled, and pulverized with a sieve having an opening of 100 μm. Thus, a carrier 1 was prepared.

The volume average particle diameter of the core particles was measured using a particle size analyzer MICROTRAC SRA (product of Nikkiso Co., Ltd.) while setting the measuring range to from 0.7 to 125 μm.

Carrier 2

A carrier 2 was prepared in the same manner as the carrier 1 except that the amounts of the dispersing agent (phosphate-based surfactant) and the defoaming agent (silicone-based) were both changed to 0 part.

Carrier 3

A carrier 3 was prepared in the same manner as the carrier 1 except that the dispersing agent (phosphate-based surfactant) was replaced with another dispersing agent (sulfate-based surfactant).

Carrier 4

A carrier 4 was prepared in the same manner as the carrier 1 except that the dispersing agent (phosphate-based surfactant) was replaced with another dispersing agent (sulfonic-acid-based surfactant).

Carrier 5

A carrier 5 was prepared in the same manner as the carrier 1 except that the dispersing agent (phosphate-based surfactant) was replaced with another dispersing agent (carboxylic-acid-based surfactant).

Carrier 6

A carrier 6 was prepared in the same manner as the carrier 1 except that the tungsten-oxide-doped tin oxide was replaced with an indium-oxide-doped tin oxide.

Carrier 7

A carrier 7 was prepared in the same manner as the carrier 1 except that the tungsten-oxide-doped tin oxide was replaced with a phosphorus-pentoxide-doped tin oxide.

Carrier 8

A carrier 8 was prepared in the same manner as the carrier 1 except that the tungsten-oxide-doped tin oxide was replaced with an alumina surface-treated with tungsten-oxide-doped tin oxide.

Carrier 9

A carrier 9 was prepared in the same manner as the carrier 1 except that the barium sulfate was replaced with a magnesium oxide.

Carrier 10

A carrier 10 was prepared in the same manner as the carrier 1 except that the barium sulfate was replaced with a magnesium hydroxide.

Carrier 11

A carrier 11 was prepared in the same manner as the carrier 1 except that the barium sulfate was replaced with a hydrotalcite.

Preparation of Developer

Each of the carriers 1 to 11 (93 parts) was stir-mixed with the toner A (7 parts) by a TURBULA MIXER at a revolution of 81 rpm for 3 minutes. Thus, developers 1 to 11 were prepared for evaluation. Further, developers for replenishment corresponding to these developers were prepared using each carrier and the toner such that the toner concentration became 95%.

The types of the elements A and B, the standard deviation of the value A/B that is the ratio of the element A to the element B in intensity measured by the energy dispersive X-ray spectrometer (EDX), and the proportion of Ba exposed at the surface of the coating layer were determined according to the methods described above. The results are presented in Table 1. The materials used in each Example are also presented in Table 1.

TABLE 1

| | | Formulation | | | | EDX Detection Elements | | | Amount of |
|---|---|---|---|---|---|---|---|---|---|
| | | | | | | Conductive | Coating | Standard | Exposure |
| | Carrier | Conductive Component | Chargeable Particles | Coating Resin | Dispersing Agent | Component (Element A) | Resin (Element B) | Devialion A/B | of Ba [atomic %] |
| Ex. 1 | Carrier 1 | Tungsten-oxide-doped tin oxide | Barium sulfate | Silicon resin | Phosphate-based surfactant | Sn | Si | 0.33 | 0.2 |
| Comp. Ex. 1 | Carrier 2 | Tungsten-oxide-doped tin oxide | Barium sulfate | Silicon resin | — | Sn | Si | 0.45 | 0.2 |
| Ex. 2 | Carrier 3 | Tungsten-oxide-doped tin oxide | Barium sulfate | Silicon resin | Sulfate-based surfactant | Sn | Si | 0.36 | 0.2 |
| Ex. 3 | Carrier 4 | Tungsten-oxide-doped tin oxide | Barium sulfate | Silicon resin | Sulfonic-acid-based surfactant | Sn | Si | 0.35 | 0.2 |
| Ex. 4 | Carrier 5 | Tungsten-oxide-doped tin oxide | Barium sulfate | Silicon resin | Carboxylic-acid-based surfactant | Sn | Si | 0.39 | 0.2 |
| Ex. 5 | Carrier 6 | Indium-oxide-doped tin oxide | Barium sulfate | Silicon resin | Phosphate-based surfactant | Sn | Si | 0.37 | 0.2 |
| Ex. 6 | Carrier 7 | Phosphorus-pentoxide-doped tin oxide | Barium sulfate | Silicon resin | Phosphate-based surfactant | Sn | Si | 0.35 | 0.2 |

TABLE 1-continued

| | Carrier | Formulation: Conductive Component | Formulation: Chargeable Particles | Formulation: Coating Resin | Formulation: Dispersing Agent | EDX Detection Elements: Conductive Component (Element A) | EDX Detection Elements: Coating Resin (Element B) | Standard Deviation A/B | Amount of Exposure of Ba [atomic %] |
|---|---|---|---|---|---|---|---|---|---|
| Ex. 7 | Carrier 8 | Alumina surface-treated with tungsten-oxide-doped tin oxide | Barium sulfate | Silicon resin | Phosphate-based surfactant | Sn | Si | 0.33 | 0.2 |
| Ex. 8 | Carrier 9 | Tungsten-oxide-doped tin oxide | Magnesium oxide | Silicon resin | Phosphate-based surfactant | Sn | Si | 0.33 | — |
| Ex. 9 | Carrier 10 | Tungsten-oxide-doped tin oxide | Magnesium hydroxide | Silicon resin | Phosphate-based surfactant | Sn | Si | 0.33 | — |
| Ex. 10 | Carrier 11 | Tungsten-oxide-doped tin oxide | Hydrotalcite | Silicon resin | Phosphate-based surfactant | Sn | Si | 0.33 | — |

Developer Property Evaluations

Carrier Deposition at Solid Portions in Initial Stage

Each of the above-prepared developers 1 to 11 was put in a commercially-available digital full-color multifunction peripheral (PRO C9100, product of Ricoh Co., Ltd.) for image evaluation as follows.

The above machine was placed in an environmental evaluation room (at 25° C., 60% RH) and each of the developers 1 to 11 was put therein. A process of forming a solid image under a specific development condition, in which the charging potential (Vd) was −600 V, the potential of the portion corresponding to the image portion (solid portion) after exposure was −100 V, and the development bias DC was −500 V, was conducted but interrupted by turning off the power supply, to count the number of carriers deposited on the photoconductor after image transfer. Specifically, a 10 mm×100 mm area on the photoconductor was subjected to evaluation.

The evaluation criteria are as follows.

A+: The number of the deposited carriers is 0.

A: The number of the deposited carriers is from 1 to 3.

B: The number of the deposited carriers is from 4 to 10.

C: The number of the deposited carriers is 11 or more.

Ranks A+, A, and B are acceptable.

Carrier Deposition at Solid Portions Over Time

Each of the above-prepared developers 1 to 11 was put in a commercially-available digital full-color multifunction peripheral (PRO C9100, product of Ricoh Co., Ltd.) for image evaluation as follows. Specifically, the above machine was placed in an environmental evaluation room (at 25° C. 60% RH), and a running test in which an image having an image area rate of 0.5% was continuously produced on 1,000,000 sheets was performed using each of the developers 1 to 11 and those for replenishment. After completion of the running test, the degree of carrier deposition was evaluated at solid portions. The evaluation was performed in the same manner as described in "Carrier Deposition at Solid Portions in Initial Stage" described above, except for being performed after the running test on 1,000,000 sheets.

The evaluation criteria are as follows.

A+: The number of the deposited carriers is 0.

A: The number of the deposited carriers is from 1 to 3.

B: The number of the deposited carriers is from 4 to 10.

C: The number of the deposited carriers is 11 or more.

Ranks A+, A, and B are acceptable.

Time-Dependent Charge Stability

Using a digital full-color multifunction peripheral (PRO C9100, product of Ricoh Co., Ltd.) and each of the developers 1 to 11 and those for replenishment, a running test in which an image having an image area rate of 40% was continuously produced on 1,000,000 sheets was performed. After completion of the running test, the carriers were subjected to an evaluation. An initial charge amount (Q1) of each carrier was measured by preparing a sample by mixing each of the carriers 1 to 11 and the toner A at mass ratio of 93:7, then triboelectrically charging the sample, and measuring the charge amount of the sample using a blow off device TB-200 (product of Toshiba Chemical Corporation). A charge amount (Q2) of each carrier after the running test on 1,000,000 sheets was measured in the same manner as above except that the carrier was taken out from the developer used in the running test by removing the toner using the blow off device. The rate of change of charge amount was defined as an absolute value of $(Q1-Q2)/(Q1)\times100$.

The evaluation criteria are as follows.

A+(Very good): 0 or more and less than 5

A (Good): 5 or more and less than 10

B (Usable): 10 or more and less than 20

C (Poor): 20 or more

Ranks A+, A, and B are acceptable.

Charge Rising Property

The amount of charge of each sample prepared from each of the developers 1 to 11 was measured using a blow-off device TB-200 (product of Toshiba Chemical Corporation). A charge amount Q1 and a charge amount Q2 were measured 15 seconds after and 600 seconds after, respectively, of the start of mixing of the carrier and the toner. The charge rising property was defined as an absolute value of $(Q1-Q2)/(Q1)\times100$. The evaluation criteria are as follows.

A+(Very good): 15 or more

A (Good): 10 or more and less than 15

B (Usable): 5 or more and less than 10

C (Poor): 0 or more and less than 5

Ranks A+, A, and B are acceptable.

Toner Scattering

Using a digital full-color multifunction peripheral (PRO C9100, product of Ricoh Co., Ltd.) and each of the developers 1 to 11 and those for replenishment, a running test in which an image having an image area rate of 40% was continuously produced on 1,000,000 sheets was performed. After completion of the running test, the toner accumulated below the developer bearer was sucked and collected, and the mass thereof was measured. The evaluation criteria are as follows.

A+(Very good): 0 mg or more and less than 50 mg

A (Good): 50 mg or more and less than 100 mg

B (Usable): 100 mg or more and less than 250 mg

C (Poor): 250 mg or more

Ranks A+, A, and B are acceptable.

Comprehensive Evaluation

From the above evaluation results, comprehensive evaluation was made according to the following criteria.

A+: Very good

A: Good

B: Usable

C: Poor

Ranks A+, A, and B are acceptable.

The evaluation results are presented in Table 2.

TABLE 2

| | Carrier | Carrier Deposition at Solid Portions in Initial Stage | Carrier Deposition at Solid Portions Over Time | Time-dependent Charge Stability | Charge Rising Property | Toner Scattering | Comprehensive Evaluation |
|---|---|---|---|---|---|---|---|
| Ex. 1 | Carrier 1 | A+ | A+ | A+ | A+ | A+ | A+ |
| Comp. Ex. 1 | Carrier 2 | C | C | C | B | B | C |
| Ex. 2 | Carrier 3 | A | A | A | B | B | B |
| Ex. 3 | Carrier 4 | A | A | A+ | B | B | B |
| Ex. 4 | Carrier 5 | B | B | A | B | B | B |
| Ex. 5 | Carrier 6 | A | B | A | A+ | A | B |
| Ex. 6 | Carrier 7 | A | A | A+ | A+ | A | A |
| Ex. 7 | Carrier 8 | A+ | A+ | A+ | A+ | A+ | A+ |
| Ex. 8 | Carrier 9 | A+ | A+ | B | A+ | A+ | A |
| Ex. 9 | Carrier 10 | A+ | A+ | B | A+ | A+ | A |
| Ex. 10 | Carrier 11 | A+ | A+ | B | A+ | A+ | A |

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A carrier for forming an electrophotographic image, the carrier comprising:

a core particle; and a coating layer coating the core particle, the coating layer containing:

a conductive component comprising an element A;

a coating resin comprising an element B, a dispersing agent, and a defoaming agent, wherein the element A is undetected in the coating resin by an energy dispersive X-ray spectrometer, wherein the element B is undetected in the conductive component by the energy dispersive X-ray spectrometer, and wherein a standard deviation of a value A/B is 0.4 or less, where the value A/B is a ratio of the element A to the element B in intensity measured by the energy dispersive X-ray spectrometer.

2. The carrier according to claim 1, wherein the element B is silicon.

3. The carrier according to claim 1, wherein the conductive component comprises at least one member selected from the group consisting of: doped tin oxides doped with tungsten, indium, phosphorus, tungsten oxide, indium oxide, or phosphorus oxide; and particles having at least one of the doped tin oxides on surfaces thereof.

4. The carrier according to claim 1, wherein the coating layer further contains chargeable particles, the chargeable particles comprising at least one member selected from the group consisting of barium sulfate, zinc oxide, magnesium oxide, magnesium hydroxide, and hydrotalcite.

5. The carrier according to claim 4, wherein the chargeable particles comprise barium sulfate, and a proportion of barium exposed at a surface of the coating layer is 0.1% by atom or more.

6. A developer comprising:

the carrier according to claim 1; and a toner.

7. An image forming method comprising:

forming an image with the developer according to claim 6.

8. An image forming apparatus comprising:

the developer according to claim 6.

9. A process cartridge comprising:

the developer according to claim 6.

10. The carrier according to claim 1, wherein the dispersing agent is at least one selected from the group consisting of phosphate-based surfactants, sulfate-based surfactants, sulfonic-acid-based surfactants, and carboxylic-acid-based surfactants.

11. The carrier according to claim 10, wherein the dispersing agent is a phosphate-based surfactant.

12. The carrier according to claim 1, wherein the defoaming agent is a silicone-based defoaming agent.

* * * * *